Dec. 7, 1965   V. S. RELLER   3,222,139
COLD WATER QUICKLIME SLAKER
Filed Sept. 11, 1962   2 Sheets-Sheet 1
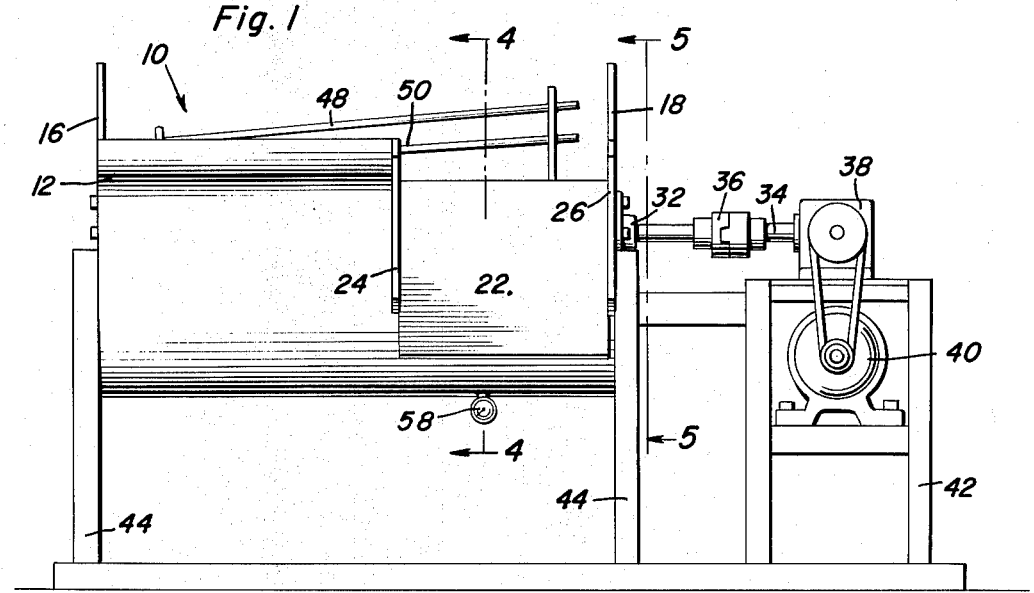
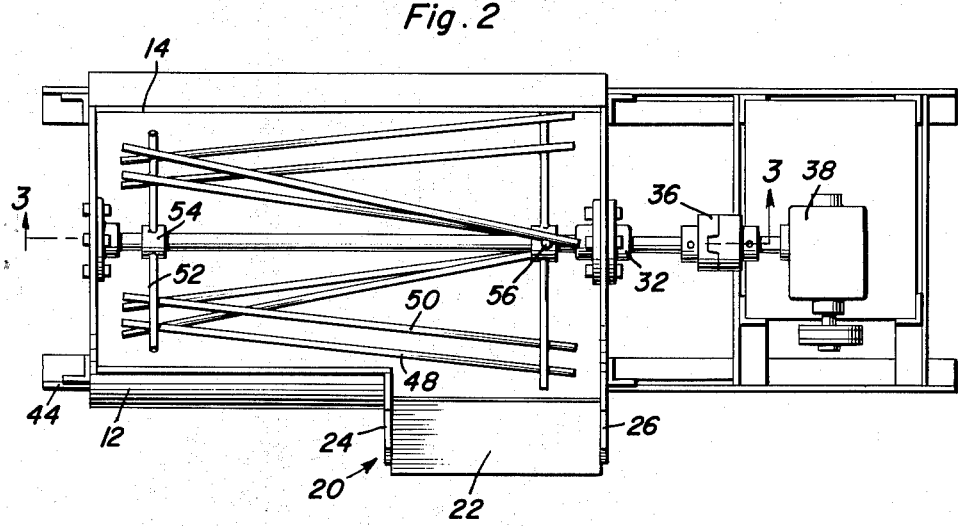
Virgil S. Reller
*INVENTOR.*

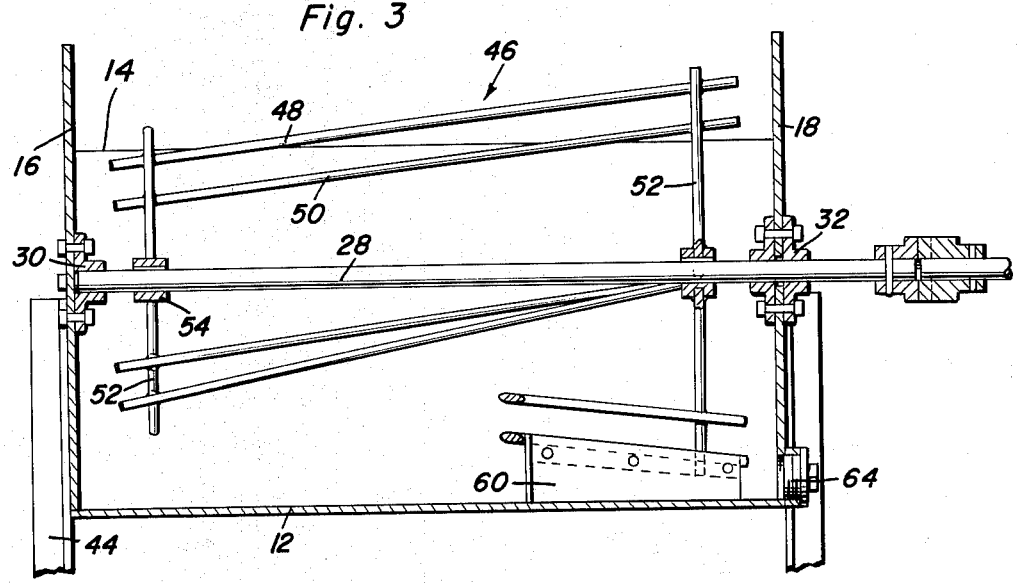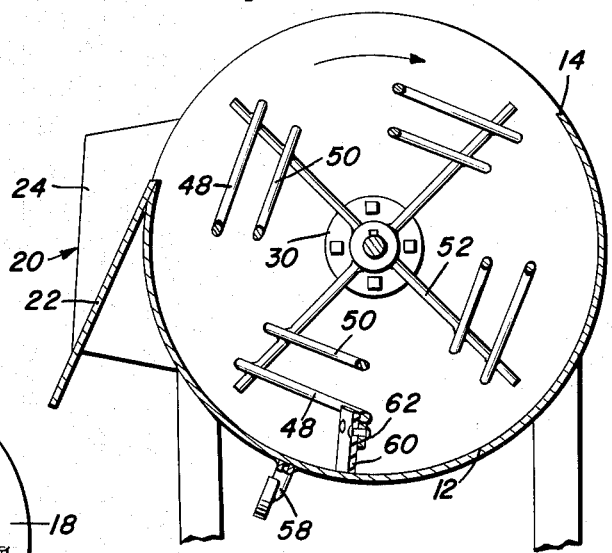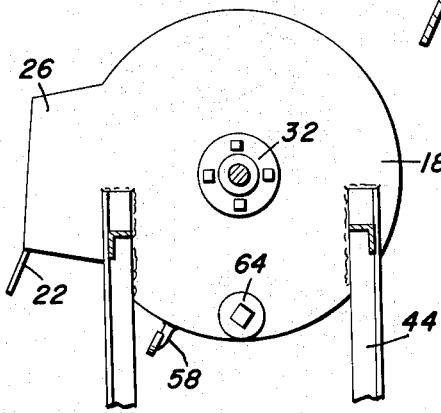

United States Patent Office 3,222,139
Patented Dec. 7, 1965

3,222,139
COLD WATER QUICKLIME SLAKER
Virgil S. Reller, St. Cloud, Minn.
(7237 Stevens Ave., Richfield 23, Minn.)
Filed Sept. 11, 1962, Ser. No. 222,778
2 Claims. (Cl. 23—287)

The present invention generally relates to the slaking of lime, and more particularly to a cold water quicklime slaker wherein the heat necessary to effect an immediate and complete slaking of the quicklime is maintained by regulating the addition of cold water thereto.

In the slaking of quicklime, it has been generally found that if the temperature within the slaker is maintained above 150° F., the lime will slake immediately and completely. Because of the manner in which quicklime develops great heat when treated with water, it is a primary intention of the present invention to provide a device wherein the desired amount of heat can be maintained by the selective introduction of cold or unheated water thereby avoiding the necessity of providing any external source of heat to either the slaker or the water introduced therein.

In conjunction with the above object, it is an intention of the present invention to provide a means, located externally of the slaker tank, for indicating the correct temperature of the interior of the tank.

Also, because of the tendency of lime to scale, it is contemplated that a paddle or scraper be provided within the tank adjacent the portion to which the thermometer is attached so as to prevent the accumulation of scale thereon.

Another object of the present invention resides in the provision of a slaker wherein means are provided so as to ensure the discharge of the lime grit which normally accumulates at the bottom of the tank.

Additionally, it is an object of the present invention to provide a lime slaker capable of receiving lime from a lime feeder at one end thereof and subsequently discharging the slaked lime and grit from the other end thereof, this discharged material generally being received in another apparatus for the separation of the grit from the lime and the distribution of the lime.

Likewise, an object of the present invention is to provide a quicklime slaker which is simple in construction and requires little or no maintenance over long periods of time, the slaker being equally capable of operation with an intermittent feed or a constant feed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the quicklime slaker comprising the present invention;

FIGURE 2 is a top plan view of the slaker comprising the present invention;

FIGURE 3 is a cross-sectional view taken substantially on a plane passing along line 3—3 in FIGURE 2;

FIGURE 4 is a cross-sectional view taken substantially on a plane passing along line 4—4 in FIGURE 1; and FIGURE 5 is a cross-sectional view taken substantially on a plane passing along line 5—5 in FIGURE 1.

Referring now more particularly to the drawings, reference numeral 10 generally designates the slaker comprising the present invention. This slaker 10 consists of an elongated semi-cylindrical tank 12 provided with an opening 14 extending the full length of the tank 12, two circular end portions 16 and 18, and a discharge chute 20 provided at one end of the elongated tank 12. As will be appreciated from the drawings, the discharge chute 20 has the inner end thereof positioned below the upper edge of the side wall of the tank with the chute 20 consisting of a downwardly and outwardly extending plate 22 bounded on each side thereof with outwardly extending flanges 24 and 26, the flange 26 being integrally formed with the end wall 18 if so desired.

Centrally located within the tank 12 and extending longitudinally thereof is a shaft 28 rotatably mounted by bearing means 30 on the end wall 16 and bearing means 32 on the end wall 18, the shaft 28 extending through the end wall 18 and being coupled to a drive shaft 34 by coupling means 36, the drive shaft 34 extending outwardly from a gear box 38 driven by a suitable source of power such as the motor means 40. The motor 40 is to be mounted on a suitable supporting framework 42 with the tank 12 supported in an upright position by legs 44 welded thereto, however, it is contemplated that the slaker of the present invention be capable of being mounted upon any suitable supporting base.

Mounted on and rotatable with the shaft 28 are a plurality of agitating blades 46 with each blade consisting of two elongated rods 48 and 50. These blades 46 are secured to the shaft 28 by means of outwardly extending spokes 52 peripherally spaced about and secured to collars 54 which are in turn fixedly attached to the shaft in any conventional manner such as by set-screws 56. The spokes 52 positioned at both the rear and the front of the shaft are arranged out of line with each other with the rods 48 and 50 welded thereto so as to be inclined rearwardly relative to the direction of travel of the blades as illustrated by the arrow in FIGURE 4. As will be appreciated, this rearward inclination causes a movement of the slaked lime toward the discharge chute of the tank 12, the lime originally being introduced adjacent the end plate 16 through the open top 14.

It is contemplated that the agitator blades 46 be turned at a rate of approximately twenty-four revolutions per minute with a complete and immediate slaking of the quicklime taking place due to a maintaining of the temperature above 150°. In order to ensure such a temperature, a suitable temperature indicating means or thermometer 58 is secured to the external surface of the tank 12 in circumferential alignment with the discharge chute 20 at a point spaced slightly therefrom. Because of the fact that lime is highly prone to form scales, it is deemed essential to keep the inside of the tank scale free in the area of the thermometer so as to ensure a proper reading. Accordingly, a paddle 60, preferably of semirigid rubber or plastic, is secured to one of the rods 48 either directly or by means of a depending plate 62 welded to the rod 48 with the outer end of the paddle 60 being in wiping engagement with the inner surface of the tank 12 thus maintaining a substantially scale free condition. Further, it is contemplated that this paddle 60, being substantially as long as the width of the discharge chute 20, additionally function so as to ensure that the grit normally present in lime be discharged through the discharge chute 20, the paddle 60 lifting this grit, which tends to sink to the bottom of the tank 12, and propelling the grit upwardly toward the discharge chute 20. As mentioned briefly supra, this grit will subsequently be effectively separated from the slaked lime by means of an additional apparatus not forming a part of the present invention.

Finally, so as to facilitate the cleaning of the slaker, a drain having a removable plug 64 is provided at one end of the tank 12.

From the foregoing, it is considered to be readily apparent that a novel cold water quicklime slaker has been defined wherein a plurality of agitating blades, each blade consisting of two elongated rods, are used to agitate a combination of quicklime and water so as to cause a slaking of the quicklime and a movement of the slaked quicklime toward the discharge end of the slaker with a thermometer being provided on the exterior surface of the slaker so as to continually indicate the temperature within the slaker thus enabling the amount of cold water introduced therein to be regulated so as to ensure that this temperature remain above 150° thus resulting in an immediate and complete slaking of the quicklime. Further, it will be noted that an elongated paddle means has been provided to both ensure the proper recording of the temperature within the tank and to additionally ensure the complete discharge of the material therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a cold water quicklime slaker, a longitudinally extending tank, an elongated shaft extending therethrough, means rotatably mounting said shaft, agitating blades, means fixedly securing said blades to said shaft for rotation therewith so as to effect the slaking of lime introduced into the tank, an inlet means provided adjacent the first end of said tank, a discharge chute provided adjacent the second end of said tank, means for constantly indicating the temperature within the slaker tank, said agitating blades each consisting of a plurality of elongated spaced rods, the means securing said blades to said shaft consisting of radially extending spokes provided adjacent each end of the shaft, said rods secured to and extending between said spokes, said rods as they approach the discharge end of the tank being inclined rearwardly in relation to the direction of travel of the blades, said temperature indicating means consisting of a thermometer mounted against the outer surface of the tank circumferentially aligned with and spaced from the discharge chute and means fixed to one of said blades for maintaining the inner surface of the tank free of any scale build-up in the area of the thermometer so as to ensure a reading indicative of the true temperature within the tank.

2. In a cold water quicklime slaker, a longitudinally extending tank, an elongated shaft extending therethrough, means rotatably mounting said shaft, agitating blades, means fixedly securing said blades to said shaft for rotation therewith so as to effect the slaking of lime introduced into the tank, an inlet means provided adjacent the first end of said tank, a discharge chute provided adjacent the second end of said tank, means for constantly indicating the temperature within the slaker tank, said temperature indicating means consisting of a thermometer mounted against the outer surface of the tank circumferentially aligned with and spaced from the discharge chute, and means for maintaining the inner surface of the tank free of any scale build-up in the area of the thermometer so as to insure a reading indicative of the true temperature within the tank, said build-up preventing means consisting of a paddle of substantially the same width as the discharge chute, said paddle being mounted on one of said blades for rotation therewith, the outer longitudinal edge of said paddle being in wiping engagement with the inner surface of the tank in line with the discharge chute thus preventing the accumulation of scale while also insuring the discharge of the lime grit through the discharge chute, said agitating blades each consisting of a plurality of elongated spaced rods, the means securing said blades to said shaft consisting of radially extending spokes provided adjacent each end of the shaft, said rods secured to and extending between said spokes, said rods as they approach the discharge end of the tank being inclined rearwardly in relation to the direction of travel of the blades.

References Cited by the Examiner
UNITED STATES PATENTS

| | | | |
|---|---|---|---|
| 2,149,269 | 3/1939 | Brooks et al. | 23—188 |
| 2,551,034 | 5/1951 | Merriman et al. | 23—280 |
| 2,904,401 | 9/1959 | Booth | 23—285 X |
| 3,100,694 | 8/1963 | Schaub et al. | 23—270 |

MORRIS O. WOLK, *Primary Examiner.*

JAMES H. TAYMAN, Jr., *Primary Examiner.*